United States Patent [19]

Banucci et al.

[11] 4,118,535

[45] Oct. 3, 1978

[54] NOVEL POLYETHERAMIDE-IMIDE EPOXY RESIN BLENDS

[75] Inventors: Eugene G. Banucci, Scotia; Edith M. Boldebuck, Schenectady, both of N.Y.

[73] Assignee: General Electric Company, Schenectady, N.Y.

[21] Appl. No.: 628,331

[22] Filed: Nov. 3, 1975

[51] Int. Cl.$^2$ .............................................. C08L 63/00
[52] U.S. Cl. ................................ 428/383; 260/830 P; 428/378; 428/458; 528/206
[58] Field of Search ...................................... 260/830 P

[56] References Cited

U.S. PATENT DOCUMENTS

| | | | |
|---|---|---|---|
| 3,416,994 | 12/1968 | Chalmers | 260/830 P |
| 3,453,292 | 7/1969 | Izumi | 260/830 P |
| 3,458,595 | 7/1969 | Ulmer | 260/830 P |
| 3,562,214 | 2/1971 | Kubens | 260/830 P |
| 3,663,651 | 5/1972 | Traut | 260/830 P |
| 3,838,101 | 9/1974 | Steele | 260/830 P |

FOREIGN PATENT DOCUMENTS

| | | | |
|---|---|---|---|
| 45-12,985 | 11/1970 | Japan | 260/830 P |
| 46-41,821 | 10/1971 | Japan | 260/830 P |

OTHER PUBLICATIONS

Powder Coating: Why–How–When; Detroit Society for Paint Technology; Journal of Paint Technology; vol. 44, No. 565, Feb. 1972, pp. 30–37.

*Primary Examiner*—Paul Lieberman
*Attorney, Agent, or Firm*—F. Wesley Turner; Joseph T. Cohen; Charles T. Watts

[57] ABSTRACT

This invention is concerned with a new class of polyetheramide-imide epoxy resin blends. More particularly, the invention is concerned with polyetheramide-imide epoxy resin blends which exhibit melt viscosities suitable for solventless-dry powder coating and curing of polyetherimide insulating films on various substrates. The polyetheramide-imide epoxy resin blends are also suitable for the manufacture of filaments, fibers, films, molding compounds, coatings, etc.

17 Claims, No Drawings

NOVEL POLYETHERAMIDE-IMIDE EPOXY RESIN BLENDS

BACKGROUND OF THE INVENTION

1. Field of the Invention

This invention is concerned with a new class of polyetheramide-imide epoxy resin blends. More particularly, the invention is concerned with polyetheramide-imide epoxy resin blends which exhibit melt viscosities suitable to solventless-dry powder coating and curing of polyether-imide insulating films on various substrates.

2. Description of the Prior Art

Solventless-dry powder coating materials which can be applied in the absence of pressure to various substrates to provide electrical insulation for materials employed in the manufacture of electrical items such as motors, coils, magnet wires, etc., are highly desired materials. The identification of thermosetting materials having the foregoing properties which sinter, flow, level and cure at elevated temperatures in the absence of pressure to form smooth, continuous substantially void-free film surfaces especially when employed in fluidized resin bed coating processes are especially desirable raw materials. Heretofore, insulating materials generally having the electrical characteristics associated with cured polyetheramide-imide resins, i.e. polyetherimides have not been available which permit the solventless-dry powder coating of electrical items in fluidized bed coating processes.

DESCRIPTION OF THE INVENTION

The novel compositions of our invention comprise polyetheramide-imide epoxy resin blends of the empirical formula

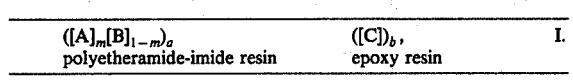

| $([A]_m[B]_{1-m})_a$ | $([C])_b$, | I. |
|---|---|---|
| polyetheramide-imide resin | epoxy resin | | wherein A represents a polyamide (polyamic acid) structural unit of the polyetheramide-imide resin, B represents a polyimide structural unit of the polyetheramide-imide resin, wherein the polymer mole fraction $m$ represents a number equal to or greater than zero, preferably a number less than about 0.5, C stands for a polyepoxy resin, the resin blend proportion fraction $a$ represents a number greater than zero, preferably a number greater than about 0.1 and less than 1, and more preferably greater than about 0.50 and less than about 0.95, and the sum of $a$ plus $b$ equals 1.0.

The A and B units of formula I comprise, respectively, units of the following formulas:

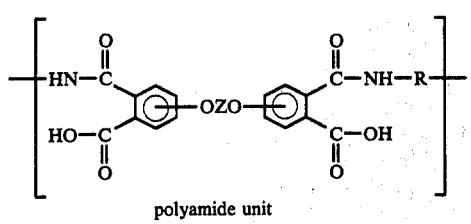

polyamide unit

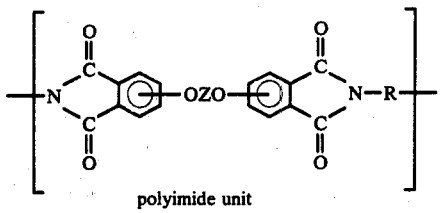

polyimide unit

The O—Z—O units of the polyamide or polyimide units can be in the 3 or 3' or 4 or 4' positions and Z is a member of the class consisting of (1)

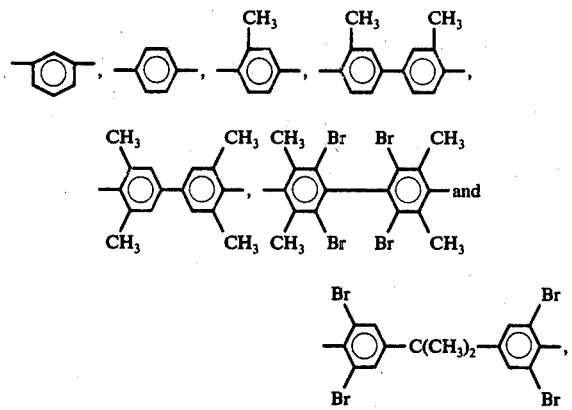

and (2) divalent organic radicals of the general formula

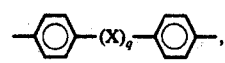

where X is a member selected from the class consisting of divalent radicals of the formulas

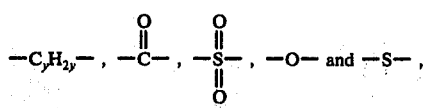

wherein $q$ is 0 or 1, $y$ is a whole number from 1 to 5, the divalent bonds of the —O—Z—O— radical are situated on the phthalic anhydride-derived units, e.g., in the 3,3'-, 3,4'-, 4,3'- or the 4,4'-positions, and R is a divalent organic radical selected from the class consisting of (a) aromatic hydrocarbon radicals having from 6-20 carbon atoms and halogenated derivatives thereof, (b) alkylene radicals and cycloalkylene radicals having from 2-20 carbon atoms, $C_{(2-8)}$ alkylene terminated polydiorganosiloxane, and (c) divalent radicals included by the formula

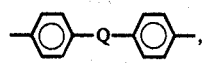

where Q is a member selected from the class consisting of

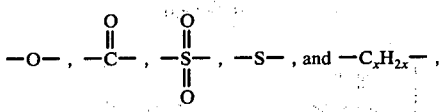

and x is a whole number from 1 to 5 inclusive.

As used herein and in the appended claims, it is to be understood that the polyetheramide-imide compositions employed in the invention can have any degree of amidization or imidization, which is generally determined by their methods of preparation well-known to those skilled in the art. Generally useful polyetheramide-imide compositions have an intrinsic viscosity [η] greater than about 0.15 deciliters per gram, preferably from about 0.20 to about 0.35 deciliters per gram, or even higher as measured in N-methyl pyrrolidone (0.1 N in lithium bromide) at 25° C.

In general, the above-described polyetheramide-imide resins can be obtained by any of the methods well-known to those skilled in the art including the reaction of any aromatic bis(ether anhydride)s of the formula

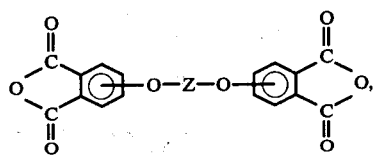

where Z is as defined hereinbefore with any diamino compound of the formula

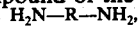

where R is as defined hereinbefore. Suitable methods include, in general, solution polymerization reactions that are advantageously carried out employing well-known solvents, e.g. tetrahydrofuran, o-dichlorobenzene/toluene mixtures, m-cresol/toluene mixtures, N-methyl pyrrolidone, dioxane/o-dichlorobenzene/toluene mixtures, N,N-dimethylformamide, etc., in which to effect interaction between the dianhydrides and the diamines at temperatures of from about 25° to about 60° C. Alternatively, the polyetheramide-imides can be prepared by melt polymerization of any dianhydride of Formula IV with any diamino compound of Formula V while heating a mixture of the ingredients at elevated temperatures with concurrent intermixing. Generally, melt polymerization temperatures between about 180° to about 350° C. preferably about 185° to about 300° C., and more preferably from about 190°–210° C. are employed. Any order of addition of chain stoppers ordinarily used in melt polymerization can be employed. The conditions of the reaction and the proportions of ingredients can be varied widely depending on the desired molecular weight, intrinsic viscosity, and solvent resistance. In general, equimolar amounts of diamine and dianhydride are employed, however, it is essential that a slight molar excess (about 1 to 10 mol percent) of an aliphatic or aromatic dianhydride be employed in order to effect the production of polyetheramide-imides having terminal anhydride groups.

Included among the many well-known methods of making polyetheramide-imides that can be employed in the practice of this invention are those disclosed in Heath et al. U.S. Pat. No. 3,847,867, Williams U.S. Pat. No. 3,847,869, Takekoshi et al. U.S. Pat. No. 3,850,885, White U.S. Pat. Nos. 3,852,242 and 3,855,178, etc.

These disclosures are incorporated herein in their entirety by reference for the purpose of teaching, by way of illustration, general and specific methods for preparing polyetheramide-imides suited to the practice of this invention.

The aromatic bis(ether anhydride)s of Formula IV include, for example,
2,2-bis[4-(2,3-dicarboxyphenoxy)phenyl]propane dianhydride;
4,4'-bis(2,3-dicarboxyphenoxy)diphenyl ether dianhydride;
1,3-bis(2,3-dicarboxyphenoxy)benzene dianhydride;
4,4'-bis(2,3-dicarboxyphenoxy)diphenyl sulfide dianhydride;
1,4-bis(2,3-dicarboxyphenoxy)benzene dianhydride;
4,4'-bis(2,3-dicarboxyphenoxy)benzophenone dianhydride;
4,4'-bis(2,3-dicarboxyphenoxy)diphenyl sulfone dianhydride;
2,2-bis[4-(3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
1,3-bis(3,4-dicarboxyphenoxy)benzene dianhydride;
1,4-bis(3,4-dicarboxyphenoxy)benzene dianhydride;
4,4'-bis(3,4-dicarboxyphenoxy)benzophenone dianhyride;
4-(2,3-dicarboxyphenoxy)-4'-(3,4-dicarboxyphenoxy)-diphenyl-2,2-propane dianhydride; etc.,
and mixtures of such dianhydrides.

Additional aromatic bis(ether anhydride)s also included by Formula IV are shown by Koton, M. M.; Florinski, F. S.; Bessonov, M. I.; Rudakov, A. P. (Institute of Heteroorganic Compounds, Academy of Sciences, U.S.S.R.), U.S.S.R. 257,010, Nov. 11, 1969, Appl. May 3, 1967, and by M. M. Koton, F. S. Florinski, Zh Org. Khin, 4 (5), 774 (1968).

The organic diamines of Formula V include, for example,
m-phenylenediamine,
p-phenylenediamine,
4,4'-diaminodiphenylpropane,
4,4'-diaminodiphenylmethane, benzidine,
4,4'-diaminodiphenyl sulfide,
4,4'-diaminodiphenyl sulfone,
4,4'-diaminodiphenyl ether,
1,5-diaminoaphthalene,
3,3'-dimethylbenzidine,
3,3'-dimethoxybenzidine,
2,4-bis(β-amino-t-butyl)toluene,
bis(p-β-amino-t-butylphenyl)ether,
bis(p-β-methyl-o-aminopentyl)benzene,
1,3-diamino-4-isopropylbenzene,
1,2-bis(3-aminopropoxy)ethane,
m-xylylenediamine,
p-xylylenediamine,
2,4-diaminotoluene,
2,6-diaminotoluene,
bis(4-aminocyclohexyl)methane,
3-methylheptamethylenediamine,
4,4-dimethylheptamethylenediamine,
2,11-dodecanediamine,
2,2-dimethylpropylenediamine,
octamethylenediamine,
3-methoxyhexamethylenediamine, 2,5-diemthylhexamethyenediamine,
2,5-diemthylheptamethylenediamine, nol-aldehyde condensates. Preferred resins of this type are those of the formula

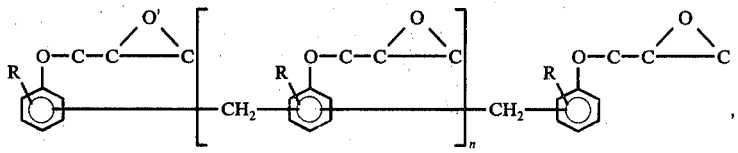

3-methylheptamethylenediamine,
5-methylnonamethylenediamine,
1,4-cyclohexanediamine,
1,12-octadecanediamine,
bis(3-aminopropyl)sulfide,
N-methyl-bis(3-aminopropyl)amine,
hexamethylenediamine,
heptamethylenediamine,
nonamethylenediamine,
decamethylenediamine,
bis(3-aminopropyl)tetramethyldisiloxane,
bis(4-aminobutyl)tetramethyldisiloxane, etc.,
and mixtures of such diamines.

The resins of the C units of Formula I comprise epoxy compounds possessing at least two 1,2-epoxide group, i.e., a

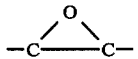

group. These polyepoxides may be saturated or unsaturated aliphatic, cycloaliphatic, aromatic or heterocyclic and may be substituted if desired with noninterfering substituents, such as halogen atoms, phosphorus atoms, hydroxyl groups, ether radicals, and the like. They may also be monomeric or polymeric.

For clarity, many of the polyepoxides and particularly those of the polymeric type are described in terms of epoxy equivalent values. The meaning of this expression which is incorporated herein by reference is described in U.S. Pat. No. 2,633,458. The polyepoxides used in this invention are those having an epoxy equivalency within the range of from about 0.8 to about 1.8 or even higher.

Various examples of polyepoxides that may be used in this invention are given in U.S. Pat. No. 2,633,458 and it is to be understood that so much of the disclosure of that patent relative to examples of polyepoxides and methods for their preparation is incorporated by reference into this specification. An example of these polyepoxides include diglycidyl ethers of bisphenol-A (DGEBA), i.e., an epoxy resin of the general formula

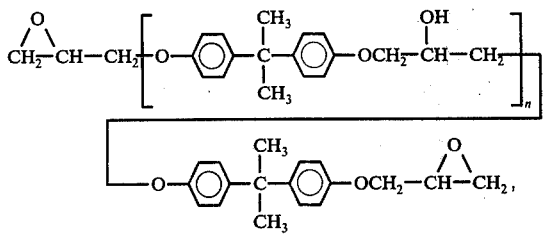

wherein $n$ is an integer having an average value of from about 0.2 to about 10. Other examples of epoxy resins include the glycidyl ethers of novolac resins, i.e., phewherein R is hydrogen or an alkyl radical and $n$ is an integer of 1 to about 10. Preparation of these polyepoxides is illustrated in U.S. Pat. No. 2,216,099 and U.S. Pat. No. 2,658,885.

Still other examples include the epoxidized esters of the polyethylenically unsaturated monocarboxylic acids, such as epoxidized linseed, soybean, perilla, oiticica, tung, walnut and dehydrated castor oil, methyl linoleate, butyl linoleate, ethyl 9,12-octadecandienoate, butyl 9,12,15-octadecatrienoate, butyl oleostearate, mono or diglycerides of tung oil, fatty acids, monoglycerides of soybean oil, sunflower, rapeseed, hempseed, sardine, cottonseed oil, and the like.

Another group of the epoxy-containing materials that can be used in this invention include the epoxidized esters of unsaturated monohydric alcohols and polycarboxylic acids, such as, for example, diglycidyl phthalate, diglycidyl adipate, diglycidyl isophthalate, di(2,3-epoxybutyl)adipate, di(2,3-epoxybutyl)oxalate, di(2,3-epoxyhexyl)succinate, di(3,4-epoxybutyl)maleate, di(2,3-epoxyoctyl)pimelate, di(2,3-epoxybutyl)phthalate, di(2,3-epoxyoctyl)tetrahydrophthalate, di(4,5-epoxydodecyl)maleate, di(2,3-epoxybutyl)terephthalate, di(2,3-epoxypentyl)thiodipropionate, di(5,6-epoxytetradecyl)diphenyldicarboxylate, di(3,4-epoxyheptyl)sulfonyldibutyrate, tri(2,3-epoxybutyl)1,2,4-butanetricarboxylate, di(5,6-epoxypentadecyl)tartarate, di(4,5-epoxytetradecyl)maleate, di(2,3-epoxybutyl)azelate, di(3,4-epoxybutyl)citrate, di(5,6-epoxyoctyl)cyclohexane-1,3-dicarboxylate, di(4,5-epoxyoctadecyl)-malonate.

Another group of the epoxy-containing materials include those epoxidized esters of unsaturated alcohols and unsaturated carboxylic acids, such as glycidyl glycidate, 2,3-epoxybutyl 3,4-epoxypentanoate; 3,4-epoxy-hexyl, 3,4-epoxypentanoate; 3,4-epoxycyclohexyl 3,4-epoxycyclohexyl methyl epoxycyclohexane carboxylate.

Still another group of the epoxy-containing materials include epoxidized derivatives of polyethylenically unsaturated polycarboxylic acids, such as, for example, dimethyl 8,9,12,13-diepoxyeicosanedioate; dibutyl 7,8,11,12-diepoxyoctadecanedioate; dioctyl 10,11-diethyl-8,9,12,13-diepoxyeicosanedioate; dihexyl 6,7,10,11-diepoxyhexadecanedioate; didecyl 9-epoxyethyl-10,11-epoxyoctadecanedioate; dibutyl 3-butyl-3,4,5,6-diepoxycyclohexane-1,2-dicarboxylate; dicyclohexyl 3,4,5,6-diepoxycyclohexane-1,2-dicarboxylate; dibenzyl 1,2,4,5-diepoxycyclohexane-1,2-dicarboxylate and diethyl 5,6,10,11-diepoxyoctadecyl succinate.

Still another group comprises the epoxidized polyesters obtained by reacting an unsaturated polyhydric and/or unsaturated polycarboxylic acid or anhydride groups, such as, for example, the polyester obtained by reacting 8,9,12,13-eicosanedienedioic acid with ethylene glycol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2,2-bis(2-cyclohexenyl)propane, epoxidized vinyl cyclohexene and epoxidized dimer of cyclopentadiene.

The epoxy resins employed in the practice of this invention, although belonging broadly to the class of epoxy compounds described hereinbefore are limited to polyepoxy resins having an epoxide equivalent weight in excess of 70. Preferably, the polyepoxide equivalent weight is within the range of from about 450 to about 1,000, or even higher, for example 5,000 or more. For clarity, polyepoxides are defined herein and in the appended claims in terms of their epoxide equivalent weight. The term epoxide "equivalent weight" refers to the weight of the epoxy resin in grams which contains one gram equivalent of epoxy.

In the preparation of the polyetheramide-imide resin epoxy resin compositions of this invention which are suitable for solventless-dry powder coatings, it is essential that the coatings be prepared from blends that are homogeneous. In general, the polyetheramide-imide epoxy resins are combinable with each other in all proportions. However, in the use of the compositions of this invention in the manufacture of electrical insulation systems for motors, coils or magnet wires (wire for magnetic coils), etc., it is preferred that the compositions contain at least 50% by weight polyetheramide-imide and preferably more often at least 75% polyetheramide-imide because of the outstanding electrical properties contributed by the polyetheramide-imide component of solvent-free PEAI-epoxy resin compositions.

In general, the polyetheramide-imide epoxy resin blends of this invention in pulverulent form are particularly suited to the continuous coating of wire substrates employing fluidized bed coating techniques. They are especially useful in fluidized bed coating methods which coat wire substrate by passing the wire through a cloud of electrostatically charged particles of polyetheramide-imide epoxy resins suspended above the upper surface of a fluidized bed of a PEAI-epoxy resin powder contained within a coating chamber. Subsequent passage of the electrostatically coated wire to another chamber at temperatures elevated from that of the coating chamber wherein the polyetheramide-imide epoxy resins are sintered, flowed, leveled and cured into the uniform coating essentially free of voids — provides excellent insulated wire coatings.

In general, in the solventless-dry powder coating applications employing the novel compositions of this invention, the following powder characterizations are generally found to be desirable — and often essential — to the economic utilization of the resin blends of this invention. In brief, the suitability of the polyetheramide-imide epoxy resin compositions to solventless-dry powder coating requires consideration of the following factors:

Average Particle Size (APS)
Sintering Temperature Range (STR)
Viscous Flow Temperature Range (VFTR)
Leveling Temperature Range (LTR)
Optimum Cure Time and Temperature Range (OCTTR)

With regard to Particle Size, as used herein and in the appended claims, the resin powders when employed in insulating wire processes generally comprise particles having a diameter or from about 5 to about 200 microns ($\mu$) and preferably from 5 to 60 microns for coatings up to 3 mils in thickness.

With regard to Sintering Temperature Ranges, as used herein in the appended claims, the resin powder sintering temperatures are defined as the lowest temperature in degrees centigrade (° C.) at which solvent-free polyetheramide-imide epoxy resin powders — hereinafter sometimes referred to for brevity as resin powders — having the particle size limitations set out hereinbefore show adherence to themselves and to a substrate, but show no significant viscous flow or leveling. In general, the "STR" for solventless-dry powder coatings are within the range of from about 75° to about 200°, preferably from about 140° to about 190° C. In general, the "STR" of any resin powder can be readily determined and reproduced within ± 5° C. accuracy by simple laboratory procedures described elsewhere in this specification.

With regard to Viscous Flow Temperature Range, as used herein and in the appended claims, viscous flow temperatures are defined as the lowest temperature in degrees centigrade (° C.) at which individual polymer particles lose all angularity and show a rounded or uniform curved surface at the air-melt interface — usually resembling a hemispherical droplet with the largest cross-section at a substrate-melt interface. The viscosity of the melt of the resin powders within the "VFTR" is in the order of $10^4$ to $10^5$ poise at zero or low shear (0.025 sec.$^{-1}$). In general, the polymer powders heated at the viscous flow temperature will form a film but will not necessarily flow out to form a completely smooth surface.

In general, the resin powder which exhibits viscous flow, as defined above, is suitable for production of coatings of thickness greater than about 2 mils. A resin powder which becomes fluid enough to show "leveling" before cure is well-adapted for production of high quality thin-film coatings in the order of 1 to 2 mils, as well as thicker films.

In general, the "VFTR" for solventless-dry powder coatings are within the range of from about 75° to 240°, preferably from about 155° to about 220° C. In general, the "VFTR" of any resin powder can also be readily determined and reproduced within ± 5° C. accuracy by simple laboratory procedures also described elsewhere in this specification.

With regard to the Leveling Temperature Range, as used herein and in the appended claims, "LTR" is defined as the lowest temperature at which a resin powder flows and flattens to give a thin film with a glossy surface wherein a group of resin particles coalesce to form a flat upper surface and exhibit an obvious curvature at the contact angle surrounding a periphery of a coalesced resin powder.

In general, the "LTR" for solventless dry powder coatings are within the range of from about 160° C. to 280° C., preferably from 200° C. to 250° C. In general, the "LTR" of any resin powder can also be readily determined and reproduced within ± 10° C. accuracy by simple laboratory procedures also described elsewhere in this specification.

In general as defined above, resin powders which exhibit average particle size, sintering temperature range, viscous flow temperature, and leveling temperature characteristics are suitable solventless-dry powder insulating coating materials.

Summarily, finely divided resin powders as characterized hereinbefore coalesce at temperatures below the melting point of the polyetheramide-imide resin component of the resin powders and cure into solid, homogeneous cured coatings under the influence of heat and in the absence of pressure.

In general, any method well known to those skilled in the art can be employed in the preparation of the homogeneous resin powders of this invention, including the preparation of a homogeneous admixture of polyetheramide-imide resins and epoxide resins employing either solution or melt mixing techniques for the preparation of a homogeneous uniform mixture. In general, homogeneous uniform admixtures can be prepared by dissolving the polyetheramide-imide resin and solid epoxy resins, e.g. epoxy resins having a Durrans' Mercury Method melting point range of from about 50° C. to about 180° C. or even higher in a suitable solvent such as tetrahydrofuran, dichlorobenzene, m-cresol, toluene, formamide, N-methylpyrrolidone, dioxane/orthodichlorobenzene toluene mixtures, N,N-dimethylformamide, etc., in which to affect a true solution between the polyetheramide-imide and epoxy resins, at temperatures of from about 25° to about 100° C. The homogeneous solutions can be spray-dried to form polymer resins of the desired particulate size, or alternatively the homogeneous blend of polymers can be precipitated from the solvent by using a suitable nonsolvent such as water or hexane in which to affect precipitation of the homogeneous blend of resins having a suitable particle size after drying and grinding by any suitable means. Alternatively, the polyetheramide-imides and liquid or solid epoxy resins can be melt blended and extruded with concurrent mixing at elevated temperatures, e.g. within the temperature range of from about 170° to about 350° C. The resulting extrudate can be prepared in a particulate form by any suitable method such as grinding, spray drying, precipitation from non-solvents, etc.

In addition to the polyetheramide-imide resin and polyepoxy resin components of the resin powders of this invention, the resin powders can contain other ingredients, such as low molecular weight monoepoxides wherein said monoepoxides comprise no more than 10% by weight of the polyepoxides content of the resin powders. The monoepoxides may be aliphatic or cycloaliphatic or heterocyclic and may be saturated or unsaturated and may be substituted with aromatic rings, ether groups, halogen atoms, ester groups and the like. Examples of suitable monoepoxides include, among others, styrene oxide, phenyl glycidyl ether, allyl glycidyl ether, octadecyl glycidyl ether, amyl glycidyl ether, tolyl glycidyl ether, diacetate of monoglycidyl ether of glycerol, dipropionate of the monoglycidyl ether of glycerol, diacrylate of the monoglycidyl ether of glycerol, 1,2-hexylene oxide, ethylene oxide, propylene oxide, 1-heptylene oxide, 3-ethyl-1,2-pentylene oxide, glycidyl acetate, glycidyl benzoate, glycidyl propionate, glycidyl acrylate, glycidyl allyl phthalate, glycidyl methyl maleate, glycidyl stearate, methyl 1,2-epoxypropionate, butyl 1,2-epoxypropionate, and the like.

In addition to the monoepoxide ingredients — which can be included in the resin powders which inclusion assists in providing solvent-free polymer powders that sinter, flow, level and cure into coherent films — other fillers which are nondeleterious to the characteristics of electrical insulating resin powders can also be included, e.g. nonmetallic fillers, such as particulate polytetrafluoroethylene resin, asbestos, clay, mica, vermiculite, kaolin, fumed silicas, titanium dioxide and other optional fillers or ingredients, e.g. plasticizers, flexibilizers, stabilizers, surfactant agents, pigments, dyes, reinforcements, flame retardants, diluents, and mixtures thereof, etc. In non-electrical applications, fillers which are often deleterious to the characteristics of electrical insulating resin powders can also be included, e.g. silicon carbide, molybdenum disulfide, cryolite, boron nitride, iron sulfide, metal carbides, metal oxides, carbon fibers, graphite powdered metals such as aluminum, copper and the like. In addition to the other fillers or ingredients noted hereinbefore, conventional curing agents for epoxy resins well-known to those skilled in the art which enhance certain properties of the resin powders, e.g. cut-through temperatures, may be used if desired. Representative curing agents include boron trifluoride and complexes of boron trifluoride with amines, amides, ethers, phenols and the like, etc.

The following examples illustrate — but do not limit — the best mode of practicing the invention to a person skilled in the art.

Unless otherwise indicated in the examples, the following general procedures were employed in the preparation and testing of the polymer powders of this invention. Any deviations from the general procedure is noted in the specific examples.

General Procedure

Polyetheramide-imide Resins

A series of resin powders were prepared employing polyetheramide-imide resins — characterized by dianhydride and diamino reactants — having an intrinsic viscosity $[\eta]$ of 0.2–0.6 dl./gm. at 25° C. as measured in chloroform or N-methylpyrrolidone (NMP) depending upon the degree of imidization, and a glass-transition temperature $T_g$ of 140°–225° C. The polyetheramide-imide resins were prepared in accordance with the procedures described in U.S. Pat. No. 3,850,885 which procedures are incorporated herein by reference in their entirety.

Polyepoxy Resins

The epoxy resins employed in the preparation of the resin powders were commercially available materials, e.g., Ciba Products Co.'s ECN 1280, a polyglycidyl ether of orthocresol formaldehyde novolac having a molecular weight of about 1170, an epoxide equivalent weight of about 230, and a Durrans' melting point of about 78°–81° C.; Dow Chemical Co.'s DER 332, 661 and 741, diglycidyl ethers of bisphenol-A, an epoxide equivalent weight of 175, 525, 370, respectively, and DER 732 and 736, diglycidyls ethers of propylene glycol having an epoxide equivalent weight of about 320, 190, respectively, DEN 439, an epoxy novolac resin having an epoxide equivalent weight of about 200; and Shell Chemical CO.'s EPON 828 and 1004 having an epoxide equivalent weight of about 190, 925, respectively.

Sintering, Viscous Flow, Leveling Temperatures

The sintering, viscous flow, and leveling temperatures for the resin powders were determined according to the following test sequence. A series of solvent-free powder portions having an average particle size of 200 microns or less (0.1 to 0.5 mg.) were sprinkled onto preheated glass slides resting on temperature gradient blocks at temperature intervals of about 5° C. over a temperature range of from about 130° to about 250° C. After 5 minutes, the glass slides were removed from each temperature gradient block position, allowed to cool at room temperature and the polymer particles were examined with a stereoscopic microscope at 45X magnification. The temperature at which the polymer particles reached their sintering temperature, viscous flow temperature or leveling temperature as defined elsewhere in this specification were recorded.

Various resin powders in addition to being evaluated under sintering, viscous flow, and leveling characterization were also evaluated for cut-through temperature, dissipation factor, initial flexibility after cure, and thermal flexibility life according to the following test procedures.

Cut-Through Temperatures

Unsupported films of resin powders having a uniform thickness of less than about 3 mils were prepared and were cured, generally, for 15 to 30 minutes at 300° C.

The cured films were tested by placing a small piece of the cured film between two bare copper wires crossed at a 90° angle in a cut-through apparatus commonly employed by the electrical industry in the evaluation of enameled magnet wire J.A.N.-W-583 (7 April 1948). The copper wires were electrically insulated from a metal base plate by 5 mil mica sheet. The cut-through temperature of the cured film was determined by placing the test apparatus in an air circulating oven with the copper wires connected to 110 volt AC circuit which contained an alarm system. A 1000 gram load was placed on the upper copper wire - crossed wire pair. The loaded film resting between the crossed wires was heated in an air circulating oven at a rate of about 10° C. per minute and the temperature was recorded at which the film flowed enough to permit electrical contact between the wires, thus activating the alarm system.

Dissipation Factor

Cured resin powders in the form of films were tested for the property described as dielectric dissipation factor which is defined herein as the "dielectric dissipation factor, loss tangent" and which is related to the heat produced in an electrically insulating material under imposed voltage. The electrical insulating quality of a film is dependent on its ability to retain a low dissipation factor at the maximum temperature of use.

The tests were performed accordingly. Cured resin powder film was clamped between two circular brass discs of 1.25 inch diameter which served as electrodes. The film with attached electrodes was immersed in a number 10 C Transformer Oil and the dissipation factor was read on a capacitance test bridge of standard type capable of measuring directly the dissipation factor of a film in the range from 0 to 0.5 at 60 hertz. The oil was slowly raised in temperature and additional dissipation factor values were measured at a series of temperatures between 120° and 220° C.

Initial Flexibility

Flexibility of cured resin powder film was determined by a simple 180° bend test accordingly. Cured resin films of 3 mil thickness were tested for acceptable flexibility by a test described as "bend and crease" in which a film is folded over on itself to a 180° angle and the fold is then creased by normal pressure from the fingers. A film is considered to have adequate flexibility if it does not crack or break into two pieces in this test.

Thermal Flexibility Life

Cured resin films were measured for their resistance toward embrittlement at 300° C. Strips of 3 mil film were heated in an air circulating oven maintained at 300° C. The films were withdrawn periodically and cooled to room temperature and then tested for flexibility by the above-mentioned bend and crease test. By this procedure the approximate time at 300° C. required to produce enough embrittlement so that the thermally aged film would break into two pieces in the bend and crease test was determined and recorded.

EXAMPLE I

This example illustrates the reduction in the sinter, viscous flow and leveling properties of polyetheramide-imide epoxy resins which are suitable for dry powder coating applications. Set out in Table I hereafter is a summary of the proportions by weight of polyetheramide-imide resin and polyepoxy resin, the sintering temperature, the viscous flow temperature and the leveling temperature of the various blends.

TABLE I

| Run Nos. | Polyepoxy Type | BPADA:MDA[1] PEAI Type | | Weight Ratio Polyepoxy:PEAI | Melt Character ° C. | | |
|---|---|---|---|---|---|---|---|
| | | | | | Sinter | Viscous Flow | Leveling |
| 1A | DER 661 | 5%x's | BPADA[2] | 50:50 | 140 | 155 | 220 |
| 1B | " | " | " | 25:75 | 190 | 210 | 235 |
| 1C | " | " | " | 15:85 | 195 | 225 | >250 |
| 1D | " | " | " | 5:95 | 190 | 230 | >250 |
| 1E | " | " | " | 0:100 | 225 | >250 | >250 |
| 2A | DER 661 | 10%x's | BPADA[3] | 50:50 | 150 | 170 | 225 |
| 2B | " | " | " | 25:75 | 170 | 205 | 235 |
| 2C | " | " | " | 15:85 | 185 | 225 | >250 |
| 2D | " | " | " | 5:95 | 195 | 225 | 235 |
| 2E | " | " | " | 0:100 | 205 | 235 | >250 |
| 1F | EPON 1004 | 5%x's | BPADA | 25:75 | 170 | 200 | >250 |

TABLE I-continued

| Run Nos. | Polyepoxy Type | BPADA:MDA[1] PEAI Type | Weight Ratio Polyepoxy:PEAI | Melt Character °C. | | |
|---|---|---|---|---|---|---|
| | | | | Sinter | Viscous Flow | Leveling |
| 2F | " | 10%x's BPADA | 25:75 | 175 | 210 | >250 |

[1]BPADA = Bisphenol A dianhydride, i.e. 2,2-bis[4-(3,4-dicarboxy phenoxy)phenyl] propane, having the structural formula:

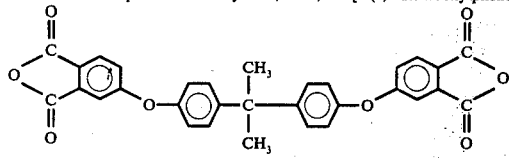

MDA = Methylene dianiline having the structural formula:

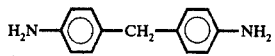

[2]Intrinsic viscosity of the 5% excess BPADA polymer was .48 dl./g. as measured in NMP at 25° C.*
[3]Intrinsic viscosity of the 10% excess BPADA polymer was .37 dl./g. as measured in NMP at 25° C*
*degree of imidization 100%.

As illustrated by the above examples, the sinter, viscous flow and leveling characteristics, primarily the viscous flow and sintered characteristics of the polymer powders are significantly decreased in value as the amount of epoxy resin increases in relationship to the amount of polyetheramide-imide resin contained in the combinations.

EXAMPLE II

This example illustrates that liquid epoxy resins may be employed in the preparation of polyetheramide-imide epoxy resins which are suitable for dry powder coating applications. This is made possible by a concurrent blending and heating operation of a polyetheramide-imide resin and epoxy resin mixture in which the epoxy resin is lightly crosslinked or B-staged to form a solid but fusible polyetheramide-imide epoxy resin blend.

In this example the blending and heating of the PEAI and liquid epoxy resins was performed on a laboratory scale using a preheated glass slide on a temperature calibrated hot plate. The solid polyetheramide-imide resin and the liquid polyepoxy resin were placed on the slide and mixed using a metal spatula for the prescribed time.

TABLE II

| Run Nos. | Polyepoxy Type | BPADA:MDA[1] PEAI Type | Weight Ratio Polyepoxy:PEAI | Time & Temperature for B-staging | Melt Character °C. | | |
|---|---|---|---|---|---|---|---|
| | | | | | Sinter | Viscous Flow | Leveling |
| 1G | DER 332 | 5%xs BPADA[2] | 25:75 | 3 minutes, 150° C. | 165° C. | 205° C. | 250 |
| 2G | | " | | 5 minutes, 150° C. | 165 | 185 | 250 |
| 3G | DER 332 | 10%xs BPADA[3] | 25:75 | 3 minutes, 150° C. | 165 | 185 | 250 |
| 4G | | " | | 5 minutes, 150° C. | 155 | 175 | 250 |

[1], [2] and [3] = Same footnotes as Example I, Table I

In commercial operations, most conveniently blending and heating is carried out on a mixing extruder such as a Werner-Pfleiderer ® Twin-Screw extruder. Alternatively, a Brabender ® mixing bowl or Helicone ® mixer may be employed.

EXAMPLE III

A series of polyetheramide-imide epoxy resin blends were prepared and the resulting properties of the resulting resin powders after formation into cured films were characterized according to cut-through temperature °C., dissipation factor at 140° C., temperature at which dissipation factor reached a value of 0.2, initial flexibility, and thermal flexibility life at 300° C.

Table III

Physical Properties of Various Polyetherimide-Epoxide Blends

| Run Nos. | Polyepoxy Type | Curing Agent | BPADA:MDA[1] PEAI Type | Weight Ratio Polyepoxy:PEAI | Cut-Through Temp. | DF at 140° C. | Temperature (°C.) at which DF is 0.2 | Initial Flexibility | Thermal Flexibility Life Hours at 300° C. to Failure |
|---|---|---|---|---|---|---|---|---|---|
| 1H | DER 661 | none | 1-2%x's BPADA[2] | 25:75 | 215 | .001 | 200 | Pass | 2 |
| 1I | DER 332 | " | " | 25:75 | 267 | .010 | 203 | " | 1 |
| 1J | DEN 439 | " | " | 25:75 | 283 | .001 | 213 | " | .25 |
| 1K | EPON 828 | " | " | 25:75 | 275 | .001 | 210 | " | 1 |
| 1L | DER 736 | " | " | 25:75 | 215 | .075 | 153 | Borderline | 1 |
| 1M | DER 732 | " | " | 25:75 | 225 | .290 | 131 | Pass | 2 |
| 1N | DER 661/732 | " | " | 25:75 | 265 | .010 | 180 | " | 2 |
| 1O | EPON 828/736 | " | " | 25:75 | 255 | .005 | 181 | " | .5 |
| 1P | EPON 828/732 | " | " | 25:75 | 243 | .015 | 178 | " | 1 |
| 1Q | DEN 439/736 | " | " | 25:75 | 275 | .015 | 177 | Fail | — |
| 1R | DER 661 | BF$_3$ . MEA[3] | " | 25:75 | 270 | .001 | 185 | Borderline | .25 |
| 1S | EPON 1004 | BF$_3$ . MEA | " | 25:75 | 285 | — | — | Pass | .25 |
| 1T | ECN 1280 | BF$_3$ . MEA | " | 25:75 | 308 | .001 | 200 | Fail | — |
| 1U | DER 661 | Dicy.[4] | " | 25:75 | 230 | .001 | 210 | Pass | 2 |
| 1V | EPON 1004 | Dicy. | " | 25:75 | 225 | .001 | 220 | " | 3 |
| 1W | ECN 1280 | Dicy. | " | 25:75 | 290 | .001 | 205 | Borderline | .25 |

Table III-continued
Physical Properties of Various Polyetherimide-Epoxide Blends

| Run Nos. | Polyepoxy Type | Curing Agent | BPADA:MDA[1] PEAI Type | Weight Ratio Polyepoxy: PEAI | Cut-Through Temp. | DF at 140° C. | Temperature (° C.) at which DF is 0.2 | Initial Flexibility | Thermal Flexibility Life Hours at 300° C. to Failure |
|---|---|---|---|---|---|---|---|---|---|
| 1X | DER 661 | none | " | 50:50 | 245 | .020 | 163 | Fail | — |
| 1Y | none | " | " | 0:100 | 278 | .001 | 220 | Pass | 7 |

[1] = Same as in Footnote I, Table I
[2] = Intrinsic viscosity of the 2% BPADA polymer was 0.52 dl./g. as measured in NMP at 25° C.
[3] = $BF_3$. MEA is a monoethylamine-boron triflouride adduct.
[4] = Dicy. is dicyandiamide.

Resin powders of the compositions and characteristics of this example having an average particle size of from 5 to 60 microns can be employed in solventless-dry powder fluid bed electrostatic coating and curing of PEAI-epoxy resins onto wire substrates to readily form insulated wire thickness having a continuous film of from 0.5–10 mils (radial thickness) and from 1.0–20 mils (diametric thickness) in wire coating process apparatuses employing fluidized bed electrostatic coating and thermal fusion and curing of the polymer particles at wire speeds of from 1 to 60 feet per minute employing round, rectangular, or strip wire or any thickness. Wire insulation of conventional film thickness, prepared accordingly, when tested at suitable voltage differentials for the detection of pinholes (voids in the cured coating which permit the flow of current from an energy source located on the surface of coating through the wire to ground) have the minimum pinhole locations suited to high electrical integrity insulation.

EXAMPLE IV

A solution of 22.90 g. (0.044 mol) of 2,2-bis[4-(3,4-dicarboxyphenoxy)phenyl]propane dianhydride (4-BPADA) in 200 ml. of tetrahydrofuran (THF) was treated dropwise with 7.93 g. (0.04 mol) of methylene dianiline (MDA) in 100 ml. of THF, in a one-necked 1-liter round-bottomed flask equipped with magnetic stirrer. After complete addition and stirring for an additional hour, the THF was removed under vacuum and replaced with 600 ml. of 50/50 mixture of toluene/chlorobenzene mixture. The flask was equipped with a Dean Stark trap and condensor. The contents of the flask were then brought to reflux and the water of imidization removed over a 6-hour period by azeotropic distillation. The toluene was removed by distillation. The resulting chlorobenzene solution was cooled and the polymer was precipitated in four liters of methanol. A white precipitate was collected and dried in a vacuum over at 100° C. The polymer had an I.V. = 0.358 dl./g. as measured in $CHCl_3$ and 0.375 dl./g. as measured in N-methyl pyrrolidone at 25° C.

7.5 g. of polymer was redissolved in methylene chloride and 2.5 g. of DER 661 added. The solvent was removed thermally to yield 10 g. of polyimide-epoxy blend. The material sintered at 170° C., underwent viscous flow at 205° C. and levelled at 235° C. When a melt-drawn film was cured at 300° C. for ½ hour a cut-through temperature of 215° C. resulted.

EXAMPLE V

A solution of 22.90 g. (0.044 mol) of 2,2-bis[4-(3,4-dicarboxyphenoxy)phenyl]propanee dianhydride (4-BPADA) in 200 ml. of tetrahydrofuran (THF) was treated dropwise with 7.93 g. (0.040 mol) of methylene dianiline (MDA) in 100 ml. of THF with stirring. After complete addition and stirring for an additional hour, 10.28 g. of EPON 1004 was added and the THF removed thermally to yield a polymer which when cured as a film gave excellent flexibility and a cut-thru temperature of 225° C.

EXAMPLE VI 80.41 g. (0.1545 mol) of 4-BPADA was placed in a Model 2CV Helicone Mixer made by Atlantic Research Corp. The mixer was heated to 545° F. with stirring and an inert gas passing through the bowl and 16.2 g. (0.15 mol) of m-phenylenediamine was added over the period of 1.5 minutes. After stirring for 60 minutes, the mixture was extruded out to yield a polymer with I.V. = 0.40 as measured in $CHCl_3$ at 25° C. Subsequently, 90 g. of the polyimide was dissolved in chloroform with 30 g. of DER 661 and the solvent was removed thermally to yield 120 g. of polyimide-epoxy blend. The material sintered at 175° C., underwent viscous flow at 225° C. and leveled at 235° C. When a melt-drawn film was cured at 300° C. for ½ hr. a cut-through temperature of 225° C. resulted. The results of this detailed example is summarized in Table IV, Run A. The results of other similarly performed Runs, different from Run A with respect to the amount and/or type of epoxy resin employed plus a control Run, are also set out in Table IV which follows:

TABLE IV
Physical Properties of Various Polyetherimide-Epoxide Blends

| Run Nos. | Polyepoxy Type | BPADA:MPDA[1] PEAT Type | Weight Ratio Polyepoxy:PEAI | Cut-Through Temperature° C. | Melt Character ° C. | | | Initial Flexibility |
|---|---|---|---|---|---|---|---|---|
| | | | | | Sinter | Viscous Flow | Leveling | |
| A | DER 661 | 3%x's BPADA[2] | 25:75 | 225 | 175 | 225 | 235 | Pass |
| B | DER 661 | " | 50:50 | 220 | 145 | 180 | 220 | Pass |
| C | EPON 1004 | " | 25:75 | 230 | 190 | 240 | >250 | Pass |
| D | EPON 1004 | " | 50:50 | 220 | 160 | 210 | 240 | Pass |

TABLE IV-continued

Physical Properties of Various Polyetherimide-Epoxide Blends

| Run Nos. | Polyepoxy Type | BPADA:MPDA[1] PEAT Type | Weight Ratio Polyepoxy:PEAI | Cut-Through Temperature° C. | Melt Character ° C. | | | Initial Flexibility |
|---|---|---|---|---|---|---|---|---|
| | | | | | Sinter | Viscous Flow | Leveling | |
| E | none | " | 0:100 | 230 | 225 | 235 | >250 | Pass |

[1]BPADA = same as in Example I, Table I
MPDA = m-phenylene diamine having the structural formula:

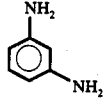

[2]Intrinsic viscosity of the 3% excess BPADA polymer was 0.40 dl./g. as measured in CHCl$_3$ at 25° C.

EXAMPLE VII

A solution of 22.90 g. (0.044 mol) of 2,2-bis[4 -(3,4-dicarboxyphenoxy)phenyl] propane dianhydride (4-BPADA) in 200 ml. of tetrahydrofuran (THF) was treated dropwise with 7.93 g. (0.04 mol) of methylene dianiline (MDA) in 100 ml. of THF, in a one-necked 1-liter round-bottomed flask equipped with magnetic stirrer. After complete addition and stirring for an additional hour, the THF was removed under vacuum and replaced with 600 ml. of a 50/50 mixture of toluene/chlorobenzene, and the flask equipped with a Dean Stark trap and condenser. The contents of the flask were then brought to reflux and the water of imidization removed over a 6-hour period by azeotropic distillation. The toluene was then removed by distillation and the chlorobenzene solution was cooled and the polymer subsequently precipitated in four liters of methanol. The white precipitate was then collected and dried in a vacuum oven at 100° C. I.V. dl./g. = 0.358 in CHCl$_3$ and 0.375 in N-methyl pyrrolidone.

25 g. of polymer was redissolved in chloroform and 25 g. of DER 661 added. The solvent was removed thermally to yield 50 g. of polyimide-epoxy blend. The material sintered at less than 140° C., underwent viscous flow at 145° C. and leveled at 200° C.

The polymer was ground, sieved to less than 53$\mu$ particle size, and was then coated onto aluminum strip from an electrostatic fluid bed operating at 15 KV. The powder-coated strips were heated for 5 minutes at 250° C., followed by 5 minutes at 275° C. and either 10 minutes or 20 minutes at 300° C. Cured films were smooth and glossy, ranging from 3 to 4 mils in thickness. Dielectric breakdown tests gave values of at least 6KV, and ⅝ of the tests gave values greater than 7KV. Cut-through temperatures for film cured 10 minutes at 300° C. were 215° C.; all samples had excellent flexibility.

The powdered particles which can be prepared from the compositions of this invention are particularly adapted for use in electrostatic powder spraying equipment, fluidized resin bed coating processes as well as fluidized resin bed coating processes which employ electrostatic transfer methods for the coating of any article. In general, in a preferred embodiment of this invention the solventless-dry powder resins are used in a fluidized bed coating process where a wire is passed through the fluidized resin bed containing a bath of fluidized powder having an electric potential different from that of the wire to be coated, such that the charged polymer powder particles are attracted and secured as a uniform layer over the surface of the wire. The uniformly coated wire is thereafter passed into a heating zone where the powdered particles are melted, flow out over the wire and cure to form a smooth and uniform cured film of resin on the wire.

In general, in addition to the above wire insulating processes, the compositions of this invention can also be employed in other wire insulating processes employing other coating processes, e.g. where the wire substrates to be coated is preheated to a temperature within the sintering, viscous flow and leveling temperature of the resin powders causing adherence of the powder particles to the wire with subsequent withdrawal from the coating area, e.g. a fluidized bed, with subsequent passage to a heating zone, e.g. a curing tower, to form a smooth, continuous, uniform film cured wire insulation film over the surface of the wire.

The resin powders of this invention in general have the desired powder characteristics required, i.e. particle size, charge acquisition, charge retention, melt flow, surface tension, wetting properties, which permit powder coating of metallic conductors at temperatures of 20° to 300° C. or even higher, and which on subsequent heating to temperatures above 200° C., e.g. temperatures of from about 250 to 400, provide insulating coatings which meet the thermal, electrical and mechanical insulation requirements for wire coating films, e.g. coating films of from 1 to 30 mils, or even thicker.

Although the preferred use of the composition of this invention is in solventless-dry powder coating and curing of insulating films on various substrates, it is to be understood that the resin powders can be molded using techniques conventionally employed in molding powdered metals such as by sintering or hot pressing; see for example "Encyclopedia of Chemical Technology" edited by Kirk and Othmer, Interscience Encyclopedia, Inc. 11, pages 54–55, New York (1953). Further, the resin powders of this invention can be employed for any of the uses to which high temperature resistant polyether-imides are used, for example, the resin powders can be molded in the form of bushings, electric insulators, compressors veins and impellers, piston rings, gears, thread guides, cams, brake linings, clutch faces, abrasive articles and the like. The resin powders can be employed also in the casting or spraying of polyetherimide-epoxy films on a variety of substrates such as metal, ceramic, fabrics, polymerics and the like.

Other modifications and variations of the present invention are possible inlight of the above teachings. It is, therefore, to be understood that changes may be made in the particular embodiments of the invention described which are within the full intended scope of the invention as defined by the appended claims.

We claim:

1. A polyetheramide-imide epoxy resin blend of the formula:

([A]$_m$[B]$_{1-m}$)$_a$   ([C])$_b$, polyetheramide-imide resin   epoxy resin wherein A represents a polyamide unit and B represents a polyimide unit of a polyetheramide-imide resin, $m$ represents a mole fraction number greater than or equal to zero, C represents a polyepoxy resin, $a$ represents a resin blend proprotion number greater than zero and less than 1, the sum of $a$ plus $b$ equals 1.0, further wherein said polyamide units is of the formula:

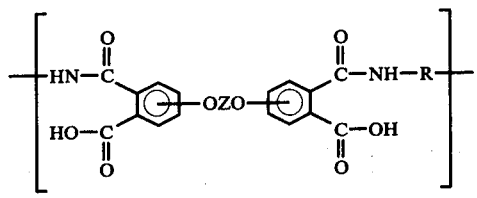

and said polyimide unit is of the formula:

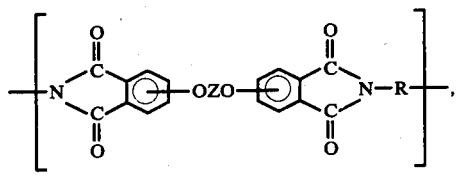

wherein the O—Z—O units of said polyamide or said polyimide units are in the 3 or 3' or 4 or 4' positions and Z is a member of the class consisting of (1)

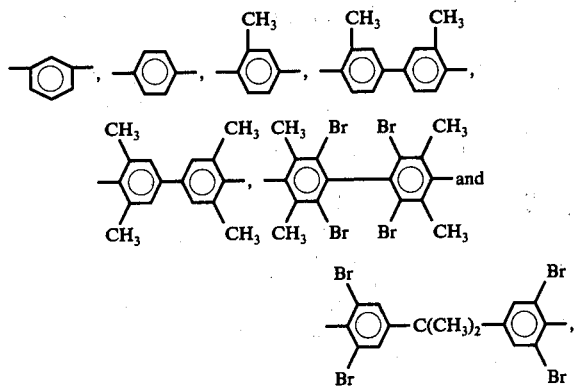

and (2) divalent organic radicals of the general formula

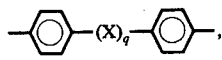

where X is a member selected from the class consisting of divalent radicals of the formulas

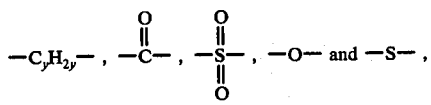

where $q$ is 0 or 1, $y$ is a whole number from 1 to 5, the divalent bonds of the —O—Z—O— radical are situated on the phthalic anhydride-derived units, e.g., in the 3,3'-, 3,4'-, 4,3'- or the 4,4'-positions, and R is a divalent organic radical selected from the class consisting of (a) aromatic hydrocarbon radicals having from 6-20 carbon atoms and halogenated derivatives thereof, (b) alkylene radicals and cycloalkylene radicals having from 2-20 carbon atoms, C$_{(2-8)}$ alkylene terminated polydiorganosiloxane, and (c) divalent radicals included by the formula

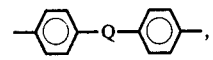

where Q is a member selected from the class consisting of

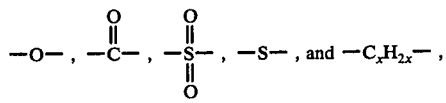

and $x$ is a whole number from 1 to 5 inclusive and further wherein said epoxy resin is a polyepoxy compound possessing at least two 1,2-epoxide groups.

2. A solventless-dry powder comprising a polyetheramide-imide epoxy resin blend of the formula:

([A]$_m$[B]$_{1-m}$)$_a$   ([C])$_b$, polyetheramide-imide resin   epoxy resin wherein A represents a polyamide unit and B represents a polyimide unit of a polyetheramide-imide resin, $m$ represents a mole fraction number greater than or equal to zero, C represents a polyepoxy resin, $a$ represents a resin blend proportion number greater than zero and less than 1, the sum of $a$ plus $b$ equals 1.0, further wherein said polyamide unit is of the formula:

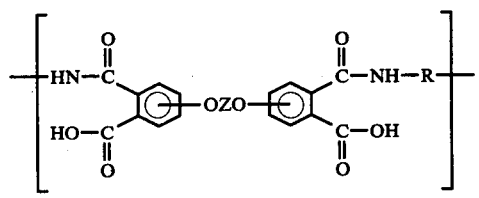

and said polyimide unit is of the formula:

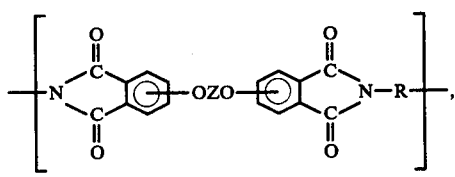

wherein the O—Z—O units of said polyamide or said polyimide units are in the 3 or 3' or 4 or 4' positions and Z is a member of the class consisting of (1)

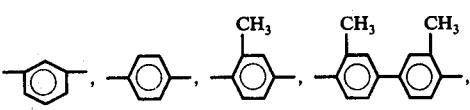

-continued

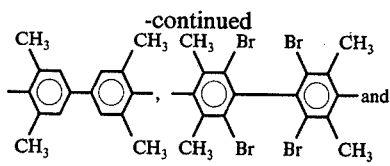

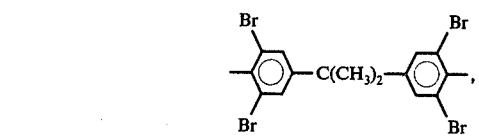

and (2) divalent organic radicals of the general formula

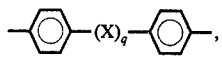

where X is a member selected from the class consisting of divalent radicals of the formulas

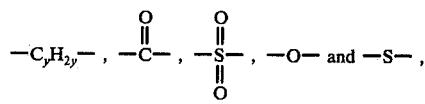

where $q$ is 0 or 1, $y$ is a whole number from 1 to 5, the divalent bonds of the —O—Z—O— radical are situated on the phthalic anhydride-derived units, e.g., in the 3,3'-, 3,4'-, 4,3'- or the 4,4'-positions, and R is a divalent organic radical selected from the class consisting of (a) aromatic hydrocarbon radicals having from 6–20 carbon atoms and halogenated derivatives thereof, (b) alkylene radicals and cycloalkylene radicals having from 2–20 carbon atoms, $C_{(2-8)}$ alkylene terminated polydiorganosiloxane, and (c) divalent radicals included by the formula

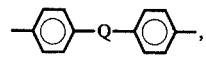

where Q is a member selected from the class consisting of

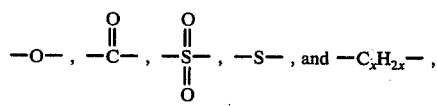

and $x$ is a whole number from 1 to 5 inclusive and further wherein said epoxy resin is a polyepoxy compound possessing at least two 1,2-epoxide groups.

3. A solventless-dry powder of the composition of claim 2, wherein the powder particles have a diameter within the range of from about 5 to about 200 microns, a sintering temperature range (STR) of from about 75° to about 200° C., a viscous flow temperature range (VFTR) of from about 75° to about 240° C., and a leveling temperature range (LTR) of from about 160° to 280° C.

4. A solventless-dry powder of the composition of claim 3, wherein the polyepoxide has an equivalent weight within the range of from about 70 to 5,000.

5. A solventless-dry powder coating of the composition of claim 4, wherein the powder particles have a diameter of from about 5 to about 60 microns, a "STR" of 140 to 190° C., a "VFTR" of 155° to 220° C., and a "LTR" of from 200° to 250° C.

6. A solventless-dry powder of the composition of claim 4, having an epoxide equivalent weight of from about 450 to about 1,000.

7. A solventless-dry powder of the composition of claim 2, wherein $a$ is at least equal to the number 0.5.

8. An electrically conductive metal substrate coated with a polyetheramide-imide epoxy resin blend of the composition of claim 2.

9. An electrically conductive metal substrate coated with a polyetheramide-imide epoxy resin film of the composition of claim 2.

10. A coated sheet material comprising a cured layer of the composition of claim 2 in firm adherence to a flexible substrate.

11. A coated wire comprising a cured layer of the composition of claim 2 in firm adherence to the wire.

12. A coated wire comprising a temperature resistant polymeric layer in firm adherence to the wire and having an overcoat of a cured layer of the composition of claim 2, in firm adherence to said temperature resistant polymeric layer.

13. The blend of claim 1, wherein "a" is at least equal to the number 0.5.

14. The claim 13 blend, having an intrinsic viscosity greater than about 0.15 deciliters per gram.

15. The claim 14 blend, in substantially solvent-less form.

16. The claim 15 blend, wherein "a" is in the range of from 0.5–0.95.

17. The claim 16 blend, wherein the O—Z—O units of said polyamide or said polyimide units are situated in the 3,3'-, 3,4'-, 4,3'- or the 4,4'-positions and Z is the divalent radical of the general formula

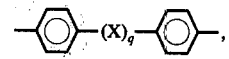

where X is a divalent radical of the formula

where $y$ is a whole number from 1 to 5.

* * * * *